March 25, 1958     C. F. IRVIN     2,828,168
LUBRICATING MEANS FOR DYNAMOELECTRIC MACHINES
Filed Feb. 23, 1955
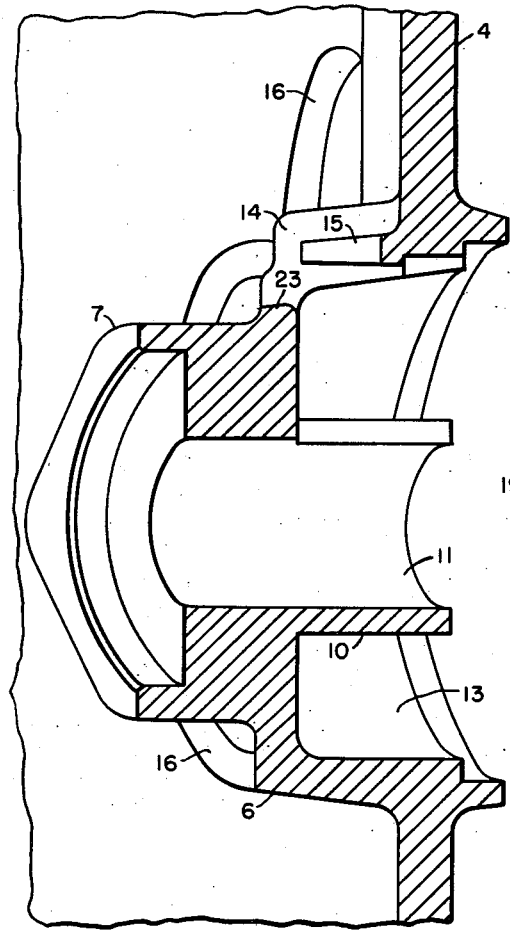
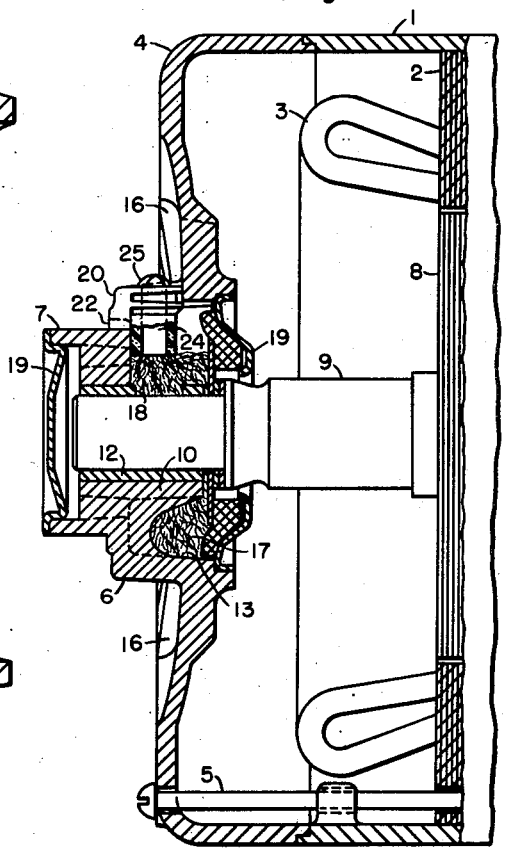
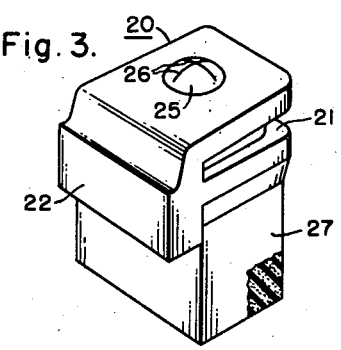
INVENTOR
Charles F. Irvin.
BY
ATTORNEY

# United States Patent Office 2,828,168
Patented Mar. 25, 1958

2,828,168

LUBRICATING MEANS FOR DYNAMOELECTRIC MACHINES

Charles F. Irvin, Lima, Ohio, assignor to Westinghouse Electric Corporation, East Pittsburgh, Pa., a corporation of Pennsylvania Application February 23, 1955, Serial No. 490,025

3 Claims. (Cl. 308—132)

The present invention relates to the construction of dynamoelectric machines and, more particularly, to improved lubricating means for oil-lubricated sleeve bearing machines.

Oil-lubricated sleeve bearings are often used in dynamoelectric machines, especially in those of the smaller sizes, such as fractional horsepower motors. In the usual construction, the bearing is supported in a hub portion of the end bracket of the machine, and an oil reservoir is provided adjacent the bearing with an oil hole or oil cup in the upper part of the hub portion to permit the addition of oil to the reservoir. Wicking is placed in the reservoir and around the bearing to supply oil to the bearing surfaces, and a spring is provided for holding the wicking in contact with the shaft through a window in the bearing.

In the conventional practice, the end bracket is made by casting, and an oil hole, or a seat for an oil cup, is machined in the hub portion after the bracket has been cast. In some designs, however, it is necessary to locate the outer face of the bracket in such a position with respect to the hub portion that it is very difficult, or even impossible, to provide the necessary machining clearance for drilling an oil hole. Another problem in the conventional practice is that the spring which holds the wicking in contact with the shaft must either be inserted in place through the small oil hole after assembly of the machine or it must be placed in position before the shaft is assembled in the bearing. In either case, it is very difficult to place the spring in the proper position, and almost impossible to inspect the placement of the spring, so that springs are frequently improperly placed, resulting in inadequate lubrication of the bearing and early failure.

The principal object of the present invention is to provide improved lubricating means for oil-lubricated sleeve bearing dynamoelectric machines which avoids the difficulties described above.

Another object of the invention is to provide a construction for sleeve bearing dynamoelectric machines in which no provision for machining an oil hole in the end bracket is necessary, and in which the wicking is held in position by means easily inserted from the outside after assembly and easily visible for inspection.

A further object of the invention is to provide a sleeve bearing dynamoelectric machine in which an opening is cast in the hub portion of the bracket, so that no machining is necessary, and the opening is closed by a separate oiler member which is readily inserted to close the opening and which has a resilient depending portion which engages the wicking to hold it in place.

Other objects and advantages of the invention will be apparent from the following detailed description, taken in connection with the accompanying drawing, in which:

Figure 1 is a longitudinal sectional view showing one end of an electric motor embodying the invention;

Fig. 2 is a fragmentary perspective view showing a longitudinal section through the hub portion of the end bracket; and Fig. 3 is a perspective view of an oiler member.

The invention is shown in the drawing embodied in an electric motor of fractional horsepower size, although it will be apparent that the invention is applicable to machines of any size or type. The motor shown in the drawing for the purpose of illustration has a frame 1 in which is supported a laminated core 2 carrying primary windings 3 of any usual or desired type. The frame 1 is closed at each end by end brackets 4, which are secured in place by means of through bolts 5 or in any other desired manner. Each end bracket 4 has a central hub portion 6, which may have an axially extending portion 7, preferably hexagonal in outline, for receiving a resilient mounting ring for supporting the motor in the usual manner. The motor also has a rotor member 8 of any usual or desired type mounted on a shaft 9.

The end brackets 4 at both ends of the motor may be identical in construction, and only one of the brackets has been shown in the drawing. Each end bracket 4 has a bearing seat 10 in the hub portion with a central bore 11 in which a sleeve bearing 12 for the shaft 9 is pressed or otherwise mounted. An annular oil reservoir 13 is formed in the hub portion surrounding the bearing seat 10. The end bracket 4 is preferably made by casting, and an opening 14 is cast in the upper part of the hub portion 6. A projection or ledge 15 is provided in the wall of the opening 14, preferably extending around three sides of the opening, as shown. Ventilating openings 16 may be provided in the bracket surrounding the hub portion 6. The annular oil reservoir 13 is filled with wicking 17 which surrounds the bearing 12 and directly engages the shaft 9 through a window 18 in the upper part of the bearing to supply oil directly to the bearing surfaces. The ends of the hub portion 6 may be closed by dust caps or bearing seals 19 of any suitable or usual type.

The opening 14 in the upper part of the hub 6 is closed by an oiler member 20. The oiler member 20 is a generally rectangular member of elastomeric or rubber-like material, preferably an oil-resistant synthetic material which has elastomeric properties. The oiler 20 is made of sufficient size to close the opening 14 when inserted in place, and is formed with a groove 21 which extends around three sides of the oiler member and is adapted to engage the projection 15 in the wall of the opening 14 to hold the oiler in place. The oiler preferably also has a projecting portion or ledge 22 on the opposite side adapted to engage the outer edge 23 of the opening 14. The oiler 20 has a central opening or oil hole 24 extending through it, and has a relatively thin integral closure portion 25 extending over the top of the oil hole 24 to close the opening. Intersecting slots 26 are cut in the closure portion 25 so that the closure normally closes the oil hole but an oil can, or other oiling means, can readily be inserted through the closure 25 to supply oil to the oil reservoir, the slots 26 permitting such insertion and reclosing the opening after withdrawal of the oil can because of the resilient material of which the oiler is made. The oiler member 20 is made of sufficient length so that its depending lower portion 27 extends down into engagement with the wicking 17 when the oiler is in place, and because of the elastomeric material of the oiler, the wicking is resiliently held in engagement with the shaft.

It will be seen that the oiler 20 is readily inserted in place during assembly of the motor, since it can easily be pushed into the opening 14 until the groove 21 engages the projection 15 to retain the oiler in place. The elastomeric material of which the oiler is made makes this possible because of its compressibility, so that it can easily be forced over the projection 15. The opening 14 is cast in the bracket 4 and no machining of the opening is necessary since the resilience of the oiler 21 makes it unnecessary to closely control the dimensions of the opening, and the oiler can be forced into the opening to effectively close it. Thus, the necessity of providing machining clearance is avoided, and the bracket 4 can be designed so that the outer face of the bracket is in a position such as shown in the drawing where machining clearance for a conventional oil hole would be very difficult to provide. It will also be noted that the lower portion 27 of the oiler engages the wicking when the oiler is inserted and is necessarily in the proper position to hold the wicking in engagement with the shaft. Thus, the difficulty of placing a spring, which has been involved in previous constructions, is avoided and the wick-engaging portion of the oiler is automatically properly positioned when the oiler is inserted. The oiler is easily assembled in position from the outside of the motor and is readily visible for inspection so that its proper placement is easily checked. Thus, a simple and relatively inexpensive construction is provided which avoids the difficulties of the prior convention structures.

A specific embodiment of the invention has been shown and described for the purpose of illustration, but it will be understood that various modifications and other embodiments are possible within the scope of the invention, and the invention is not limited to the specific details of construction shown, but includes all equivalent embodiments and modifications.

I claim as my invention:

1. A dynamoelectric machine having a stator member and a rotor member, the stator member including an end bracket, the end bracket having a central hub portion, a bearing mounted in the hub portion, said rotor member being supported in the bearing, wicking disposed in the hub portion around the bearing for supplying oil thereto, the hub portion having an opening therethrough above the bearing, an oiler member of elastomeric material fitting in said opening, the oiler member having a central oil hole therethrough and integral closure means for the oil hole and the lower portion of the oiler member extending downward into engagement with said wicking, and interengaging means on the oiler member and in the opening for retaining the oiler member in place.

2. A dynamoelectric machine having a stator member and a rotor member, the stator member including an end bracket, the end bracket having a central hub portion, a bearing mounted in the hub portion, said rotor member being supported in the bearing, wicking disposed in the hub portion around the bearing for supplying oil thereto, the hub portion having an opening therethrough above the bearing, an oiler member of elastomeric material fitting in said opening, the oiler member having a central oil hole therethrough and integral closure means for the oil hole, the oiler member having a portion extending downward in the hub portion into engagement with said wicking, a ledge on one side of said oiler member adapted to engage an edge of said opening to be supported thereon, and interengaging means on the opposite side of said oiler member and in the opening for retaining the oiler member in place.

3. A dynamoelectric machine having a stator member and a rotor member, the stator member including an end bracket, the end bracket having a central hub portion, a bearing mounted in the hub portion, said rotor member being supported in the bearing, wicking disposed in the hub portion around the bearing for supplying oil thereto, the hub portion having an opening therethrough above the bearing, an oiler member of elastomeric material fitting in said opening, a projection in said opening on one side thereof, the opposite edge of said opening being displaced radially inward from said projection, the oiler member having a groove adapted to engage said projection within the opening and having a ledge on the opposite side of the oiler member adapted to engage said opposite edge of said opening, the oiler member having a central oil hole therethrough and integral closure means for the oil hole, and the lower portion of the oiler member extending downward into engagement with said wicking.

References Cited in the file of this patent
UNITED STATES PATENTS

| | | |
|---|---|---|
| 2,175,887 | Fleischer | Oct. 10, 1939 |
| 2,546,672 | Le Clair | Mar. 27, 1951 |
| 2,594,040 | Le Clair | Apr. 22, 1952 |